US012614059B2

(12) United States Patent
Akino et al.

(10) Patent No.: US 12,614,059 B2
(45) Date of Patent: Apr. 28, 2026

(54) LEARNING-BASED NONLINEAR COMPENSATION WITH PHYSICS-INFORMED NEURAL NETWORK FOR DATA ACCESS

(71) Applicant: Mitsubishi Electric Research Laboratories, Inc., Cambridge, MA (US)

(72) Inventors: Toshiaki Koike Akino, Cambridge, MA (US); Hubert Dzieciol, London (GB); Kieran Parsons, Cambridge, MA (US); Ye Wang, Cambridge, AL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 797 days.

(21) Appl. No.: 18/048,240

(22) Filed: Oct. 20, 2022

(65) Prior Publication Data

US 2023/0409877 A1 Dec. 21, 2023

Related U.S. Application Data

(60) Provisional application No. 63/353,582, filed on Jun. 18, 2022.

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 9,998,223 B2 | 6/2018 | Zhao et al. | |
| 2019/0197407 A1* | 6/2019 | Yao ........................... | G06N 3/04 |

(Continued)

FOREIGN PATENT DOCUMENTS

EP 3352387 A1 7/2018

OTHER PUBLICATIONS

Hanna Samer et al. Signal Processing Based Deep Learning for Blind Symbol Decoding and Modulation Classification, IEEE Journal on Selected Areas in Communications, IEEE Service Center, Piscataway, US, vol. 40, No. 1, Nov. 13, 2021, pp. 82-96.

*Primary Examiner* — Marcus Smith
*Assistant Examiner* — Francesca Lima Santos
(74) *Attorney, Agent, or Firm* — Gene Vinokur

(57) ABSTRACT

A system and a computer-implemented method using physics-informed neural network (PINN) are provided for data communications. At a transmitter, the method is configured to acquire source data to be transmitted, encode the source data to codewords based on forward error correction (FEC) codes, map the codewords to amplitude symbols, modify the mapped amplitude symbols to pre-equalized symbols including pre-distort channel impairments symbols based on a predetermined physical model, and transmit digital data of the pre-equalized symbols over a channel as channel data. At a receiver, the method is configured to receive and demodulate the channel data from the channel to produce an initial estimate of bits of the received channel data, mitigate channel noise and waveform distortions in the channel data based on the initial estimate, convert the channel data consisting of shaped non-uniform symbols into a deshaped bit sequence as a uniform data sequence, decode the deshaped bit sequence to correct residual errors in the converted channel data, and store the corrected channel data to a data sink.

18 Claims, 8 Drawing Sheets

(56) References Cited

U.S. PATENT DOCUMENTS

| | | | |
|---|---|---|---|
| 2019/0266480 A1 | 8/2019 | Zhang et al. | |
| 2022/0224361 A1* | 7/2022 | Alic | H03M 13/1197 |
| 2022/0414429 A1* | 12/2022 | Torrado | G06N 3/0442 |
| 2023/0079744 A1* | 3/2023 | Cavatassi | H04L 1/0014 |
| | | | 706/21 |

* cited by examiner

LEARNING-BASED NONLINEAR COMPENSATION WITH PHYSICS-INFORMED NEURAL NETWORK FOR DATA ACCESS

FIELD OF THE INVENTION

The present invention relates generally to the field of waveform equalization for data communications, and more particularly to a method and system for learning-based nonlinear compensation based on artificial neural networks employing physical models.

BACKGROUND OF THE INVENTION

In digital communications and data storage systems, a transmitted signal waveform is often distorted by many factors including hardware defects, channel medium, and signal processing imperfections. For example, fiber-optic communications typically suffer from amplified spontaneous emission noise, shot noise, thermal noise, Kerr fiber nonlinearity, chromatic dispersion, polarization multiplexing, self-phase modulation, cross-phase modulation, Raman scattering, carrier offset, linewidth, timing jitter, etc. Many linear and nonlinear equalization or denoising methods have been proposed such as decision-feedback equalization, turbo equalization, maximum-likelihood sequence estimation, etc. However, those methods highly rely on mathematically tractable simple signal models such as linear dispersion model, auto-regressive model, Volterra series, regular perturbation model, nonlinear Schrodinger equation, Maxwell equation, Helmholtz equation, delay-Doppler-angle spectrum, etc. The model-based methods have some drawbacks: i) building accurate signal models are numerically intractable or complex; ii) model mismatch is inevitable; iii) interaction of unknown physical phenomena cannot be well-modeled; iv) models are highly sensitive to uncertain physical parameters.

Recently, data-driven learning-based methods mainly based on deep neural networks (DNNs) have emerged as promising solutions alternative to model-based methods. For example, convolutional neural networks, recurrent neural networks, and other network architectures were shown to achieve good performance to compensate signal distortion as a nonlinear equalization. In general, DNNs are configured with massively large number of trainable parameters such as weights and biases for affine transforms, and the trainable parameters are optimized by stochastic gradient methods based on training data. Such overparameterized DNNs have higher ability to approximate nearly arbitrary functions with more precision. However, data-driven learning-based methods using overparameterized DNNs inherently have some drawbacks and challenges: i) sufficiently large amount of high-quality training data is required; ii) massive data training requires high-computing power, resource and storage; iii) trained model has less-interpretability and less-certifiability; iv) finding proper DNN architectures is not obvious.

Hence, there is a need and demand to efficiently resolve those challenges for signal waveform equalizations in data communications and storage systems.

SUMMARY OF THE INVENTION

Some embodiments of the present invention are based on recognition that data communications and storage systems often suffer from signal distortion due to channel noise, device nonlinearity and signal processing imperfection. Our invention provides a way to improve the quality of data by using physics-informed neural networks. The invention resolves some challenges of the existing methods in terms of efficient training and interpretability. In some embodiments, fiber-optic physics governed by nonlinear Schrodinger equation are modeled with Koopman operator, Volterra expansion, split-step Fourier method, regular perturbation, and Runge-Kutta integration. Model parameters such as Kerr nonlinearity, fiber attenuation, dispersion etc. are trained adaptively. To mitigate residual model mismatch errors, another embodiment uses additional DNNs on top of learned physics models. Another embodiment uses joint time/frequency/space domain physics. Impairments are mitigated by designing transmitter and receiver via differentiable digital-twin based models, e.g., joint transmitter/receiver filtering, joint modulation/demodulation, and joint pre-distortion/post-distortion. The invention enables a joint design at mid-points, e.g., at programmable amplifiers, repeaters, switches, multiplexer, and routers. The physics-informed model includes implicit layers based on diffusion, equilibrium, quantum physics, and molecular physics.

The invention is based on a recognition that fully data-driven DNN models have difficulty to interpret the learned parameters and that overparameterized general DNN models require massive high-quality training data. In addition, the invention is based on a recognition that signal distortions for communications and storage systems are potentially governed by a physical model of channel links (mediums) such as Maxwell equation and nonlinear Schrodinger equation for electromagnetism, optics, and electric circuits. The present invention enables interpretable and efficiently trainable DNN models by integrating data-based method and physics-informed model to compensate for signal waveform distortion in data communications and storage systems. The physics-informed DNN models can provide non-obvious benefit in reducing the amount of redundant and insignificant parameters and interpretable adjustment of physically associated parameters. At the same time, the invention provides a way to adjust the model accuracy and complexity tradeoff by the hybrid use of data-driven DNN model and physics-informed mathematical model.

In some embodiments, fiber-optics physics governed by nonlinear Schrodinger equation are merged into a DNN model, including but not limited to neural Koopman operator, neural Volterra expansion, neural split-step Fourier method (SSFM), neural regular perturbation (RP), neural Runge-Kutta (RK) integration, neural ordinary differential equation (ODE), neural diffusion model, neural equilibrium model, collocation model, exponential integrators, etc. In some embodiments, model parameters such as Kerr nonlinearity factor, fiber attenuation, dispersion factor etc. are trainable to be adaptive to given training datasets either online or offline manner. In addition, incremental parameters such as phase correction, gain correction, and phasor correction are provided to generalize the physics model.

In some embodiments, multiple physics-informed models are used at once, e.g., RP and SSFM are merged. Further, residual DNN model is used to correct residual errors of model mismatch. Yet another embodiment uses joint time/frequency/space domain physics to merge, e.g., time-domain neural kernel and frequency-domain neural kernel are mixed up.

In some embodiments, signal impairments are mitigated by designing transmitter end and receiver end altogether via a digital-twin based model that are differentiable to enable gradient-based optimization, e.g., joint transmitter/receiver filtering design, joint encoder/decoder design, joint modulation/demodulation design, joint pre-distortion/post-distortion design, etc. Some embodiments jointly design multiple mid-points, e.g., at programmable amplifiers, repeaters, switches, multiplexer, routers, etc. besides transmitter/receiver ends through a differentiable computing graph in systems.

In some embodiments, the physics-informed model includes implicit layers based on other differentiable computations such as diffusion, equilibrium, photons, quantum physics and molecular physics with trainable parameters. In some embodiments, the integrated physic-informed DNN model is applied to audio/visual signal processing, biosignal processing, data storage read/write, radio communications, wired electric communications, etc.

Accordingly, some embodiments disclose a method for reliably transferring a data over a communication channel from a transmitter to a receiver. In some embodiments, the method and system include at least one computing processor, at least one memory bank, a transmitter having a source to accept a source data to be transferred, an encoder to encode the source data, and a front-end interface to transmit the encoded codeword as a modulated signal into the communication channel. In some embodiments, the method and system further include a communication channel comprising a wired medium channel, a wireless medium channel, an optical fiber channel, a vacuum free-space channel, a data storage medium, or a variant thereof. In some embodiments, the method and system further include a receiver having a front-end interface to receive an output signal from the communication channel, a decoder to decode the output signal, and a sink to provide the decoded codeword. In yet other embodiments, the method and system have a controller configured to specify (determine) parameters of pre-shaping codes, post-shaping codes, shaping mappers, and shaping demappers used in the encoder and the decoder, depending on a knowledge (type) of the channel link, wherein the parameters further comprise codeword lengths, code rates, and overheads.

In such a manner, the method and system of the invention use an inverse operation at a receiver to recover shaping bits and original data through FEC decoding and shaping demapper. Specifically, a computer-implemented method for recovering an encoded bit stream is performed by one or more computing processors at the receiver, causing steps of accessing an input data which represents a noisy codeword, demapping the input data to generate soft-decision bit stream given noisy quadrature amplitude modulation symbols, decoding the bit stream according to a post-shaping error-correction code, mapping the decoded bit labels into amplitude modulation symbols, demapping the amplitude symbols according to a shaping demapper, and decoding the de-shaped bit stream according to a pre-shaping error-correction code.

According to some embodiments of the present invention, a system is provided for data communications over a channel link. The system is configured to include a communication module configured to access the channel link according to a set of specifications for the data communications; and a controller configured to include a physics-informed neural network (PINN), wherein the controller is configured to determine parameters represented by the set of specifications of the communication module to compensate signal waveform distortion in the data communications according to a physical model of the channel link.

Further, some embodiments can provide a method for data communications over a channel link. In some cases, the method is referred to a computer-implemented method. The method includes steps of accessing the channel link according to a communication method based on a set of specifications for the data communications; and modifying the set of specifications for the data communications according to a control method based on a physics-informed neural network (PINN) according to a physical model of the channel link.

DETAILED DESCRIPTION OF THE PREFERRED EMBODIMENTS

Figure 1:
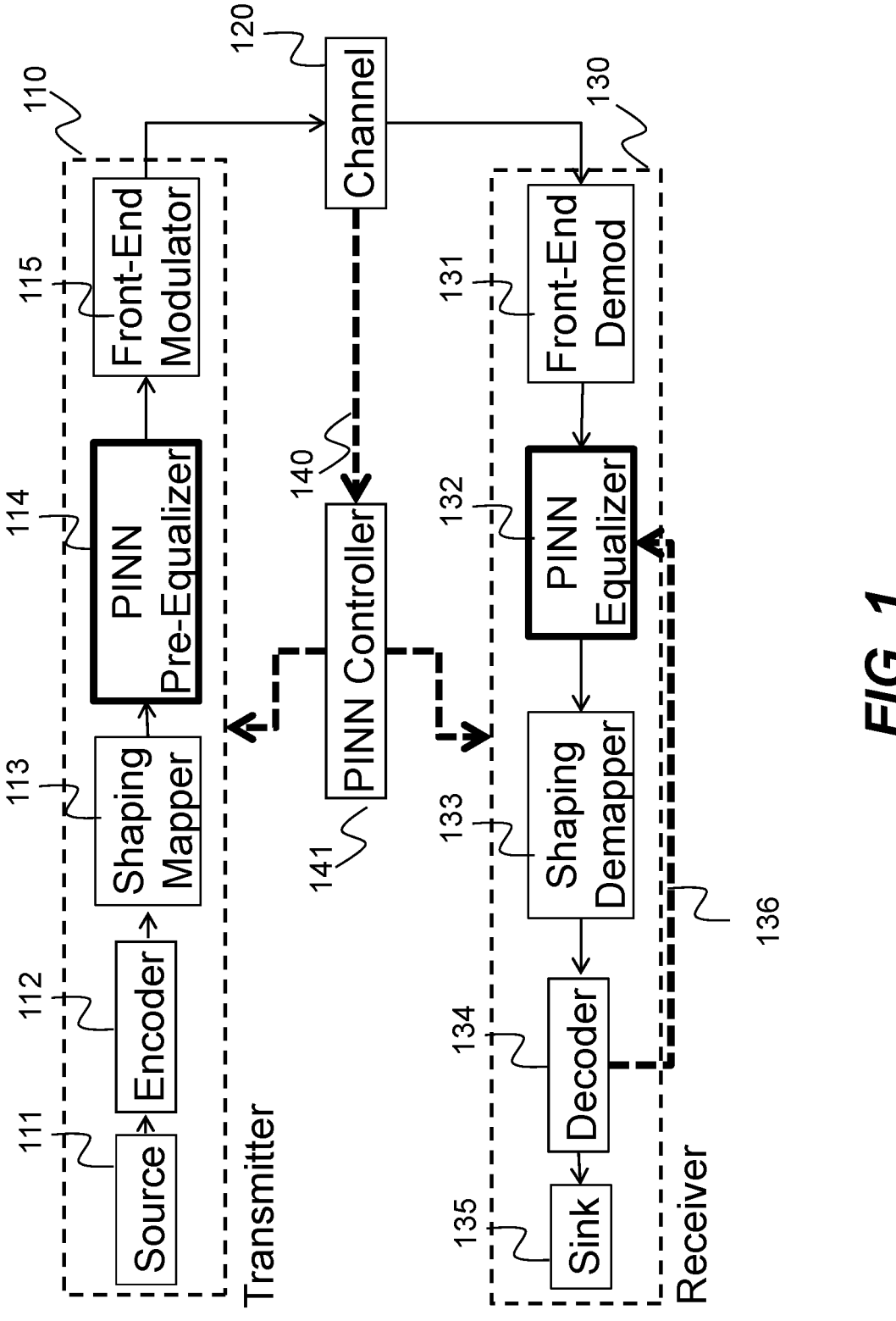
FIG. 1 is a function diagram of a communications system and method for transmissions of digital data, according to embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Some embodiments of the present invention are based on a realization that a signal equalization uses a physics-informed neural network (PINN) which integrates physical model into neural networks to improve the quality of data communications and storage systems. For example, some embodiments enable an improved machine learning method and system based on an inverse regular perturbation (RP) model to represent physical phenomena underlying lightwave propagation through fiber-optic communications. Specifically, the photonic physics in fiber is typically governed by the nonlinear Schrodinger equation (NLSE) and its variant such as the Manakov equation. The RP model uses finite difference approximation in parallel structure to numerically solve the NL SE. Some embodiments use a learned RP (LRP) model to jointly optimize trainable parameters such as step-size, gain and phase rotation to generalize parallel RP branches. The DNN model based on LRP can outperform the corresponding learned digital back-propagation (DBP) method based on a split-step Fourier method (SSFM) in a standard single mode fiber link. In such a manner, the LRP also allows a fractional step-per-span (SPS) modelling to reduce complexity while maintaining superior performance over a 1-SPS SSFM-DBP.

The physical model of the channel link to be embedded into PINN includes a finite-difference method such as split-step Fourier method, a finite-element method such as regular perturbation, a collocation model such as Runge-Kutta integration, a Volterra series expansion, a Koopman operation, an exponential integrators, an ordinary differential equation, a partial differential equation, a nonlinear Schrodinger equation, a finite impulse response, an infinite impulse response, an autoregressive model, a diffusion process, a space-time-frequency dispersion model, Maxwell equation, a quantum dynamics, a molecular dynamics, and so on.

Over the past few decades, the rapid progress of digital signal processing (DSP) technologies has enabled significantly increased throughput and reliability of coherent optical fiber communications systems. For example, linear impairments, such as chromatic dispersion (CD), polarization mode dispersion (PMD) and phase noise, have been extensively studied and addressed in the digital domain. Accordingly, Kerr fiber nonlinearity has become a dominant source that limits the maximum achievable information rates and effective signal-to-noise ratio (SNR) of the optical communications systems.

The Manakov equation has been used for propagation model of a dual-polarization (DP) signal through a standard single mode fiber (SSMF). It can be numerically solved with the split-step Fourier method (SSFM), which computes the nonlinear and linear operations sequentially in small finite-difference steps. Reducing the step size leads to higher model accuracy. Alternatively, a number of models, including regular perturbation (RP), have been studied. Digital back propagation (DBP) is a state-of-the-art method for nonlinearity compensation (NLC) by inverting the lightwave propagation through inverted SSFM calculation. Although it offers considerably improved performance over most other methods, this comes at the cost of higher computational complexity. In addition, it is highly sensitive to model parameters such as Kerr nonlinearity factor and dispersion factor. The main challenge to realize a practical NLC is hence to find the best balance between the complexity and performance.

Recent advancements in machine learning (ML) and deep neural networks (DNNs) have revolutionized a wide variety of the scientific fields including optical fiber communications and networking. Within the context of NLC and equalization, several physics-informed DNNs have been proposed for DBP. The perturbation theory was also used to enhance the learned DBP, whereas ML techniques are shown effective to improve nonlinear equalization based on the symbol triplet interactions.

In some embodiments, an ML-aided NLC approach based on an inverted RP physical model uses a parallel branch structure with generalized phasor correction parameters to be adjusted with a low-complexity ML technique to significantly increase the accuracy. Moreover, LRP with fractional step-per-span (SPS) cases, where each RP branch models more than one span, can maintain high performance over a 1-SPS SSFM-DBP, while decreasing the computational complexity.

PINN-Assisted Fiber-Optic Communications

FIG. 1 shows a communications system for transmissions of a digital data from a transmitter 110 to a receiver 130 over a channel link 120 according to some embodiments. The channel link 120 is configured to provide data communications based on electromagnetic propagation, lightwave propagation, acoustic propagation, molecular propagation, or a variant thereof. For example, the communication channel 120 includes but not limited to air medium for radio communications, copper cable for wired communications, solid-state drive for data storage reading/writing, vacuum for free-space satellite communications, and fiber cable for fiber-optic communications. During the communications to transfer the digital data from the transmitter 110 to the receiver 130, the digital data can be corrupted by a noise occurred across the channel and data processing path between a data source 111 and a data sink 135. For example, the noise includes but not limited to a thermal noise, a spontaneous emission amplifier noise, a reflection/refraction of non-uniform medium, an interference noise, and impulsive shot noise. The transmitter 110 uses a concatenation of an encoder 112, a shaping mapper 113, and a PINN-based pre-equalizer 114 to realize reliable data transmissions. The receiver 130 uses a concatenation of a PINN-based post-equalizer 132, a shaping demapper 133, and a decoder 134, to recover the original data from noisy message which was sent by the transmitter 110. The encoder and decoder are based on forward error correction (FEC) codes such as low-density parity-check (LDPC), turbo, and polar codes. Most communications systems use both transmitter 110 and receiver 130 as a communications module. Some communication systems use only the transmitter as a communication module, while some communication systems use only the receiver as a communication module.

At the transmitter 110, the data to be sent comes from the source 111 configured to accept the original data. The source can include but not limited to a memory bank to read out the data, an interface port to receive the data, and a device to generate the data. For example, in some embodiments, the source includes a voice communication device transforming an input voice signal into the digital data. The input data from the source 111 are encoded by the FEC encoder 112. In some cases, the encoded data may be referred to as a codeword. The pre-shaping FEC encoder appends a series of overhead parity bits to be robust against potential burst errors. The encoded data are mapped to a series of amplitude symbols according to the shaping mapper 113, which further appends redundancy to match the probability mass function (PMF) of the amplitude occurrence to a target distribution. The shaped amplitude symbols are labeled into a series of shaped bits, and further transformed by the PINN pre-equalizer 114. The PINN pre-equalizer modifies the shaped amplitude to pre-distort channel impairments based on physical models such as RP. The pre-equalized symbols are fed into the channel medium via a front-end circuit 115, which uses various modulation formats, including but not limited to quadrature-amplitude modulation (QAM) with and without linear transforms such as orthogonal frequency-division multiplexing (OFDM). The front-end circuit 115 can further include but not limited to electro-optic circuits for optical communications and radio-frequency circuits for radio communications. For example, the front-end circuit includes digital-to-analog converter, power amplifier, and signal pre-processing such as band-pass filter, pulse shaping, precoding, power loading, pilot insertion, and pre-distortion. For some embodiments, the transmitter uses wavelength-division multiplexing (WDM) and spatial multiplexing for multi-mode/multi-core fibers.

The channel 120 distorts the transmitted signal. For example, the channel adds additive white Gaussian noise (AWGN), co-channel interference, deep fading, impulsive noise, inter-symbol interference, Kerr-induced nonlinear interference, polarization crosstalk, and linear chromatic dispersion as well as residual hardware imperfection such as quantization error, clock jitter, overflows, laser linewidth, and carrier phase noise.

The receiver 130 first converts the channel output into electrical received signals via a front-end circuit 131, which is typically complementary of the front-end 115 at the transmitter. For example, the front-end circuit includes but not limited to analog-to-digital converter, linear equalization, nonlinear equalization, adaptive filtering, channel estimation, carrier phase recovery, synchronization, and polarization recovery. Through the front-end circuit, the received signals are demodulated to produce an initial estimate of the bits of the transmitted codeword, through PINN-based post-equalizer 132 to mitigate the channel noise and waveform distortions. For example, the demodulated signal represents a log-likelihood ratio (LLR) value as a soft-input message to the FEC decoder.

The decoded messages are then demapped by the shaping demapper 133 to convert the shaped non-uniform symbols into a uniform data sequence by removing the overhead introduced by the shaping mapper 113. In order to correct the residual errors, the deshaped bit sequence is further decoded by the FEC decoder 134, before being fed into the sink 135. The data sink 135 includes but not limited to a memory bank to write the data, an output interface port to send the data, and a device to receive the data. For example, in some embodiments, the sink includes a voice communication device transforming the decoded data into a sound signal.

Some embodiments are based on realization that the FEC codes and the shaping specification are adaptively controlled by a controller 141, according to a side information 140 of the communication channel 120. For example, parameters such as a code rate (or overhead), a codeword length, a shaping rate, and a shaping length are adaptively selected based on the channel knowledge such as a signal-to-noise ratio (SNR), a power delay profile, a channel transfer function, and a nonlinear statistics including but not limited to a mean, a variance, a kurtoris, and higher moments. The controller 141 is configured to use a look-up table or another PINN model to determine the specifications of the transmitter and/or the receiver such as best FEC codes and modulation selection given the channel knowledge for some embodiments. The specifications indicate parameters of pre-shaping codes, post-shaping codes, shaping mappers, and shaping demappers used in the encoder and the decoder, depending on a knowledge (type) of the channel link, wherein the parameters include codeword lengths, code rates, and overheads, the methods of best FEC codes and modulation selection for the channel link used in the data communications for some embodiments. The set of specifications for the communication modules further includes a set of parameters for a channel encoder, a data compressor, a constellation shaper, a modulator, a pulse-shaping filter, a multiplexer, a pre-equalizer, an amplifier, a digital-analog converter, an oscillator, an antenna, a mixer, an analog-digital converter, an equalizer, a demultiplexer, a demodulator, a constellation deshaper, a data decompressor, a channel decoder, and so on. Accordingly, the set of parameters specified by the controller includes a generator matrix of a channel coding, a shaping rate, a shaping method, a modulation format, a pulse-shaping filter length, a pre-equalizer method, an amplifier gain, a sampling rate and a quantization bit of a digital-analog converter, an oscillator frequency, an antenna size, a sampling rate and a quantization bit of an analog-digital converter, an equalizer method, a demodulator method, a constellation deshaper method, a channel decoder method, and so on. When the controller 141 determines or modifies the specifications, the parameters are adaptively chosen to best match the type of the channel link used in the data communication system.

The transmitter 110 and/or the receiver 130 can be implemented using a hardware processor operatively connected to a memory. Each of the transmitter 110 and the receiver 130 may include one or more processors. For example, the memory of the receiver 130 can store some information related to one or combination of the shaping mapper and demapper, the soft-input and the soft-output of the decoder 133, results of intermediate calculations and parameters of the encoding and the decoding, and an adaptive coding policy. All the components in the transmitter 110 and the receiver 130 may be implemented by hardware, one or more hardware processors, computer software (program or program modules), or a combination of hardware and computer software.

PR-Based Physics-Informed Models

The signal propagation in optical fibers is based on the underlying physical theory with a variant of NLSE including the Manakov equation. Specifically, signal propagation of DP complex field u(z, t) with lumped optical amplification (OA) is expressed by a partial differential equation (PDE):

$$\frac{\partial}{\partial z} u = -i\frac{\beta_2}{2}\frac{\partial^2}{\partial t^2} u + i\gamma \frac{8}{9} f(z)\|u\|^2 u + \frac{1}{\sqrt{f(z)}} n,$$

where beta2 is a dispersion coefficient, gamma is the Kerr nonlinearity factor, and n is the noise vector due to amplified spontaneous emission (ASE). The function f(z)=exp(−alpha z+alpha $L_{sp}$ floor(z/$L_{sp}$)) represents amplification and attenuation in the fiber, where alpha is a fiber loss factor and $L_{sp}$ is the span length.

This physics-informed PDE model based on Manakov NLSE is usually intractable to analytically derive the actual solution at arbitrary position z and arbitrary initial condition. To solve the physical equations, finite-difference or finite-element methods are typically used to numerically identify the waveform propagation. For some embodiments, SSFM uses finite-different steps and subsequently solves linear and nonlinear effects. The linear step considers CD, fiber attenuation and PMD based on Fourier domain to compute waveform transforms in an efficient way. The nonlinear step uses temporal domain to modify its amplitude and phase depending on the instantaneous lightwave power. ASE noise is also added at amplifiers.

For some embodiments, the RP model is used to numerically solve the Manakov NLSE by using finite-difference step to form parallel branches having linear and nonlinear operations. It is based on a recognition that optical signal propagation through SSMF can be approximated with the RP model, which solves the Manakov equation in the linear domain and bundles the nonlinear components into a small additive term. Similar to SSFM-DBP, the direction of the RP model can be inverted by flipping the direction of f(z) (i.e., switching the attenuation to amplification), and changing the sign of beta2 and gamma parameters. Accordingly, the inverted RP takes the received signal u(L, t) to reconstruct u(0, t) (i.e., back-propagated signal) for NLC. For some embodiments, to achieve better results, the gamma parameter is tuned by machine learning framework based on gradient method.

Figure 2:
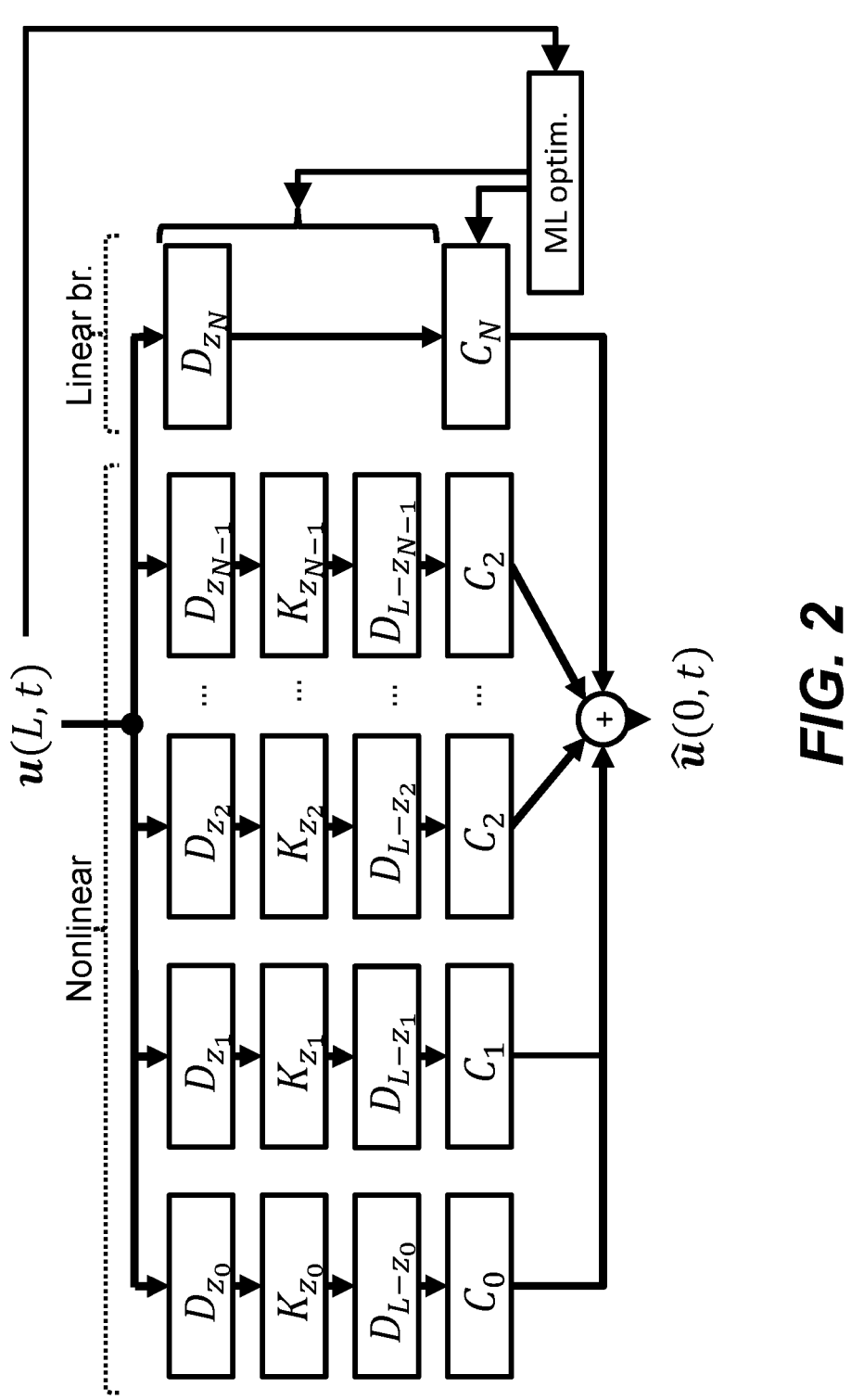
FIG. 2 shows the structure of LPR having parallelizable branches for real-time high-throughput DNNs, according to embodiments of the present invention.

FIG. 2 shows the structure of LPR having parallelizable branches, which is suitable for real-time high-throughput DNNs. The first-order RP model is expressed as $$\hat{u}(0,t) = \hat{u}_L(0,t) + \hat{u}_{NL}(0,t) + \mathcal{O}(\gamma^2),$$

where O (gamma$^2$) represents higher-order residuals to the Manakov model, L is a total link length, and the first term $$\hat{u}_L(0,t) = \mathcal{D}_{z_N}[u(L,t)]$$

is a linear branch, which contains a dispersion block, given by $$\mathcal{D}_z[\cdot] = \mathcal{F}^{-1}[\exp(i\beta_2 z\omega^2/2)\mathcal{F}[\cdot]],$$

where F denotes the discrete Fourier transform (DFT), F$^{-1}$ denotes the inverse DFT, and omega represents the angular frequency. The second term $u_{NL}$ is an aggregation of N nonlinear branches as follows:

$$\hat{u}_{NL}(0,t) = \sum_{m=0}^{N-1} \mathcal{D}_{L-z_m}[\mathcal{K}_{z_m}[\mathcal{D}_{z_m}[u(L,t)]]].$$

Here, the nonlinear block K is given by $$\mathcal{K}_{z_m}[u(t)] = i\frac{8}{9}\gamma\Delta_m f(z_m)\|u(t)\|^2 u(t),$$

where $\|\cdot\|$ denotes the 2-norm. Each branch is assigned a step size, forming an (N+1)-element vector $z = \{z_0, z_1, \ldots, z_N\}$. The last element of z is a step for the linear branch. The corresponding effective step size is calculated as $$\Delta_m = \frac{1}{\alpha}(1 - \exp(-\alpha(z_m - z_{m-1}))),$$

$$z_{-1} = 0.$$

Analogous to SPS in SSFM-DBP, the accuracy of RP increases with the number of branches and decreases with the optical launching power, i.e. more fiber nonlinearity. Note that the model allows $z_n\{0, L\}$ such that the pre-/post-linear block covers the entire link length. This is found to improve the performance for cases with small number of branches.

Figure 3:
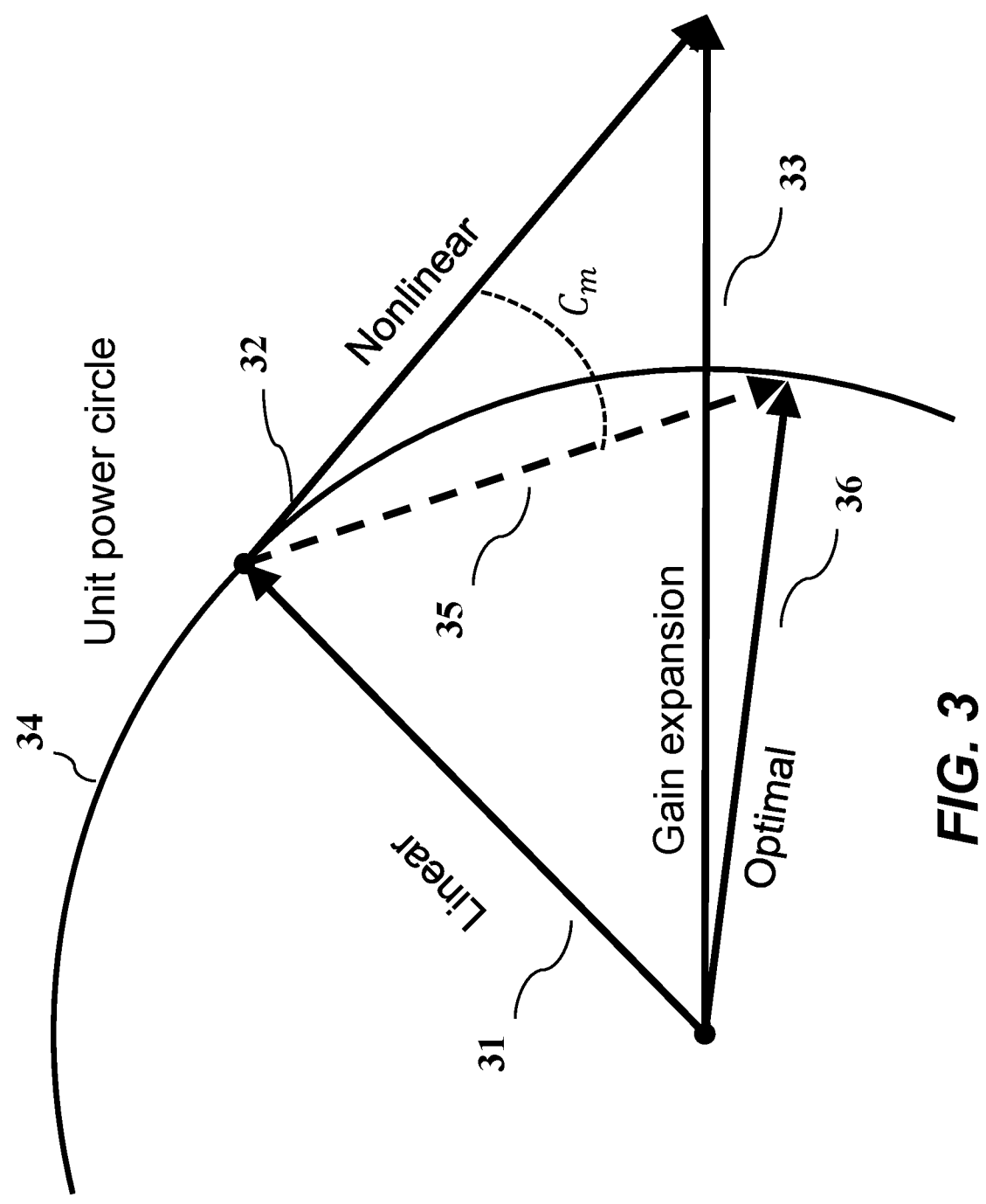
FIG. 3 shows a way to improve the RP model with a trainable phasor correction term (complex-valued scalar) $C=\{C0, C1, \ldots, CN\}$ at the end of each branch, according to embodiments of the present invention.

Although the RP model can provide reasonably accurate approximation with a large number of branches, it suffers from a significant issue when the number of branches is small. As shown in FIG. 3, one-branch conventional RP model takes a linear signal 31 and adds a 90-degree shifted, amplitude-dependent signal 32 due to K nonlinear operation, to provide the nonlinear phase rotation. Adding these two vectors may result in a phasor towards a wanted rotation 33. However, as the nonlinearity increases, it inevitably leads to gain expansion outside of the unit power circle 34. Hence, the model accuracy is considerably reduced at higher power regimes.

The present invention provides a way to improve the RP model with a trainable phasor correction term (complex-valued scalar) $C = \{C_0, C_1, \ldots, C_N\}$ at the end of each branch as shown in FIG. 3. The nonlinear term becomes $$\hat{u}_{NL}(0,t) = \sum_{m=0}^{N-1} \mathcal{D}_{L-z_m}[\mathcal{K}_{z_m}[\mathcal{D}_{z_m}[u(L,t)]]] \times C_m,$$

and the linear branch $u_L(0, t)$ is modified as $$\hat{u}_L(0,t) = \mathcal{D}_{z_N}[u(L,t)] \times C_N.$$

With this simple modification, we can collectively adjust gain and rotation of each branch 35 and find a better phasor, close to unit power 36. Hence, the LRP model in the invention can approximate the nonlinear effects more accurately and efficiently mitigate the unwanted gain expansion.

As an exemplar realization of the system, a single-carrier DP 64-ary quadrature-amplitude modulation (QAM) signal with a symbol rate of 64 Gbaud is generated at the transmitter. The generated electrical signal is pulse-shaped with a root-raised cosine (RRC) filter with a roll-off factor of 0.1. It is modulated into the optical carrier with an in-phase/quadrature modulator. The carrier is provided by a laser with a central frequency of 1550 nm and zero frequency offset. The analog optical signal is up-sampled to 8sa/sym and propagated through 10 spans of 80 km SSMF links. Each span is followed by an erbium-doped OA with a gain of 16 dB and a noise figure of 4 dB. Nonlinear inter-channel interference can occur in a 5-channel, 50 GHz spaced, wavelength division multiplexed (WDM) system. The SSMF has a Kerr coefficient of gamma=1.2 W/km, a loss factor of alpha=0.2 dB/km, and a dispersion factor of beta=17 ps/nm/km. The received optical signal is down-sampled to 2sa/sym, and passes through PINN-based equalizer including linear CD compensation, SSFM-DBP, or LRP-DBP model, to mitigate the channel impairments. The output is then shaped with a matched RRC filter. Subsequently, the received signal is normalized and de-rotated with a 1-tap equalizer and downsampled to 1sa/sym.

For some embodiments, the LRP-based PINN equalizer is trained by the adaptive momentum (Adam) optimizer with a learning rate of 0.001 to find optimal values for phaser correction factor C and step size z. We use 200 randomly generated data frames that are split 80% to 20% for training and testing, respectively. A single frame contains a snapshot of a coherently detected, digitally back-propagated signal as a target. Each snapshot has 8,192 samples per polarization at an oversampling of 2sa/sym. The frames, used for training, are simulated (forward and back-propagated) with 100-SPS Manakov SSFM. The forward propagated signal is down-sampled to 2sa/sym. The raw nonlinear phase rotation is not compensated prior to training and is included within the optimization, while 1-tap equalization is used after NLCs. Subsequently, the signal is passed to 100-SPS DBP and the corresponding nonlinearity compensated output is saved as a second element of the snapshot. Although the detected signal is at 2sa/sym, the forward propagation in the analog domain is at 8sa/sym. For some embodiments, we use a logarithmic step distribution across each fiber span, and asymmetric SSFM, i.e. the nonlinear step is at the segment boundary.

We optimize each launch power separately or jointly. The mini-batch size is set to 40 frames; there are B=160 batches (i.e. 160 frames) per epoch for training (B=40 for valida-tion); and the number of epochs is set to 6,500. The mean squared error (MSE) loss between the predicted s and the originally transmitted signal s is calculated for Ns=4096 symbols per P=2 polarizations:

$$\mathcal{L}(s, \hat{s}) = \frac{1}{B}\frac{1}{P}\frac{1}{N_s}\sum_{k=1}^{B}\sum_{j=1}^{P}\sum_{i=1}^{N_s}|s_i - \hat{s}_i|^2.$$

The complex-valued C is adjusted by the gradient of the MSE loss function.

Appropriate initialization of the trainable parameters is a key aspect to achieve higher performance and faster con-vergence. Some embodiments initialize z as a logarithmic step distribution across each span, whereas phase correction C is initialized as a vector filled with ones on real axis and zeroes on imaginary axis. For some embodiments, the model provides better convergence when Delta is decoupled from z and the initial value of f(z).

For some embodiments, the ML-based adjustment of trainable parameters in physics model is realized by a deep neural network in adaptive fashion. Specifically, the method and system using DNN use additional trainable factors on top of RP model to correct phaser. The DNN takes side information such as signal kurtoris and power of the instan-taneous waveform at different locations z. Specifically, such a system uses different side information including fiber plant information to control parameters of LRP model via DNN. For some embodiments, the PINN-based parallel equalizers are cascaded in a pipeline sequence to adjust the parallel factor and pipeline factor.

Figure 6:
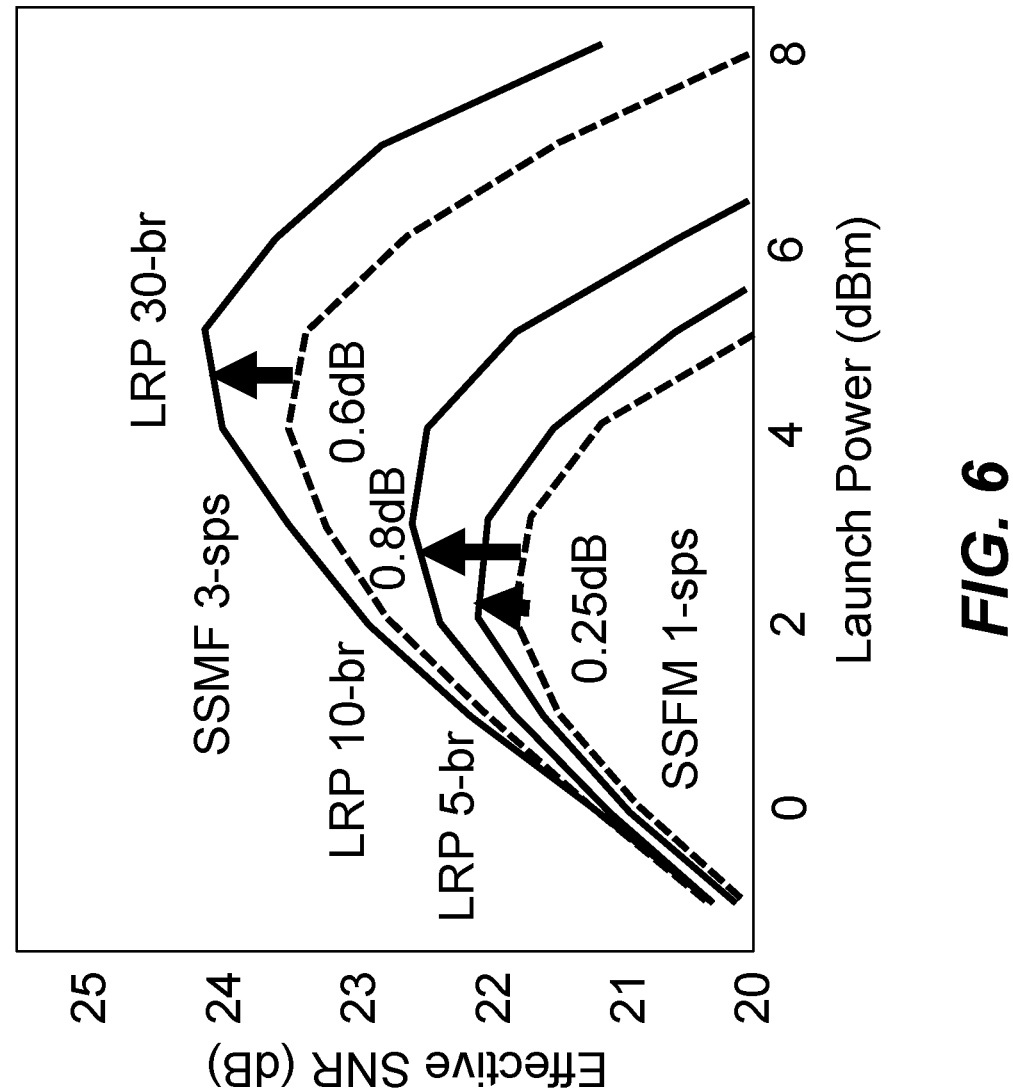
FIG. 6 shows exemplar performance gain with LRP-based PINN vs. model-based SSFM digital backpropagation in a fiber-optic channel plant, according to embodiments of the present invention.

FIG. 6 shows an exemplar performance of LRP-based PINN for a standard single-mode fiber plant. The PINN-based nonlinearity compensation outperforms learned SSFM-based method. Comparing to 1-sps SSFM digital backpropagation, 10-branch LRP achieves 0.8 dB gain while the computational complexity is comparable. More impor-tantly, the 5-branch LRP still performs better than 1-sps SSFM by 0.25 dB even though the computational complex-ity is lower. This is the benefit of trainable phaser correction. Comparing to 3-sps SSFM, 30-branch LRP still shows 0.6 dB gain.

Figure 4:
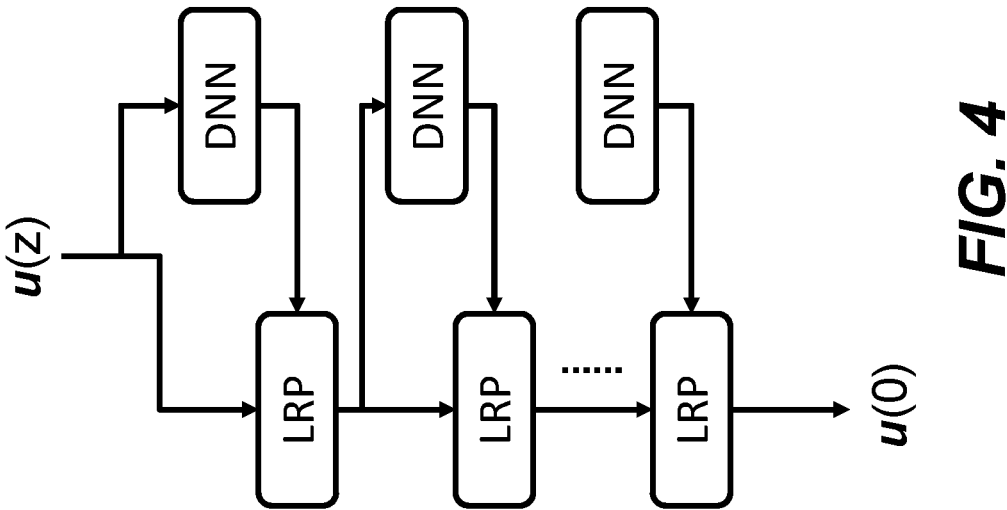
FIG. 4 shows an embodiment using a cascaded LRP models controlled by multiple staggered DNNs.

Another embodiment is based on a cascaded use of physical models such as LRP, controlled by additional DNNs. FIG. 4 shows a cascaded model controlled by a staggered DNN. Here, the DNNs use an intermediate signal to modify the parameters of LRP such as step size and nonlinearity constant. By using the intermediate signal, the potential errors caused by model mismatch can be reduced. In addition, the cascaded use of LPRs can further reduce the model mismatch per LRP.

Figures 5A, 5B, 5C:
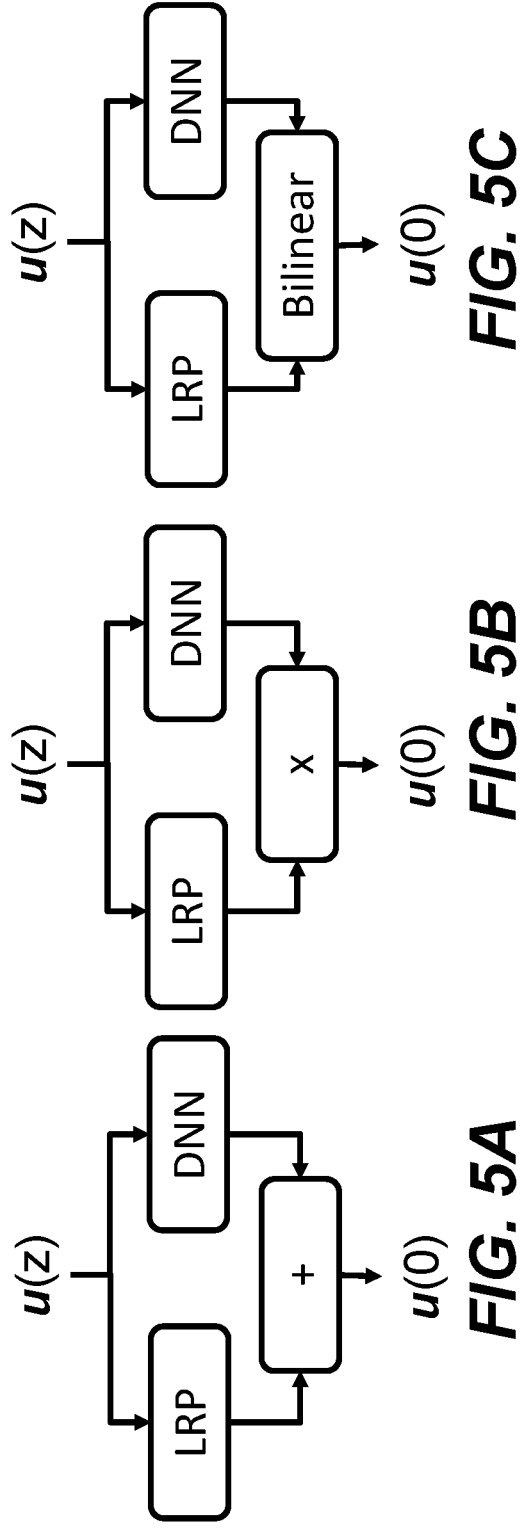
FIG. 5A shows another embodiment using external deep neural network (DNN) for residual model mismatch correction with an additive aggregation, according to embodiments of the present invention.
FIG. 5B shows another embodiment using external deep neural network (DNN) for residual model mismatch correction with a multiplicative aggregation, according to embodiments of the present invention.
FIG. 5C shows another embodiment using external deep neural network (DNN) for residual model mismatch correction with a bilinear aggregation, according to embodiments of the present invention.

Yet another embodiment uses additional DNN modules to mitigate model mismatch errors. FIG. 5A shows such an embodiment using external DNN such as convolutional neural network (CNN) and multilayer perceptron (MLP) to compensate for the residual errors of the LRP in additive way. FIG. 5B shows an embodiment using additional DNN module in multiplicative way. FIG. 5C shows an embodi-ment using additional DNN module along with trainable physics model such as LRP in a bilinear weighted way. Here, CNN is interpreted as cascaded finite-impulse response (FIR) filters which generalize well linear operations of SSFM. For some embodiments, recursive neural network (RNN) is used to represent infinite impulse response filter (IIR). The bilinear aggregation is further generalized by additional DNN block in some embodiments. The RP model has different variants including log-domain RP and higher-order RP. Some embodiments use learnable parameteriza-tion according to the variants of RP model.

Figure 5F:
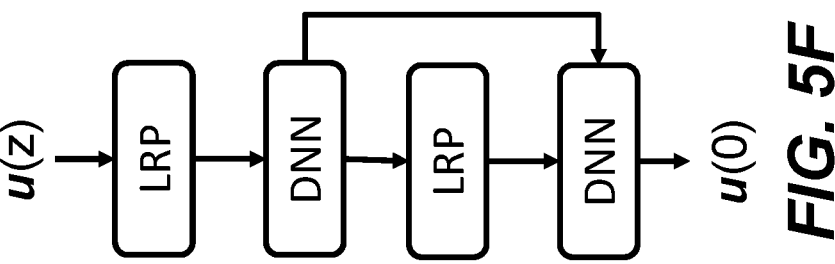
FIG. 5F shows another embodiment using a cascaded stacking of multiple LRP models and multiple deep neural network (DNN) blocks with a jumping path for residual model mismatch correction, according to embodiments of the present invention.
Figure 5E:
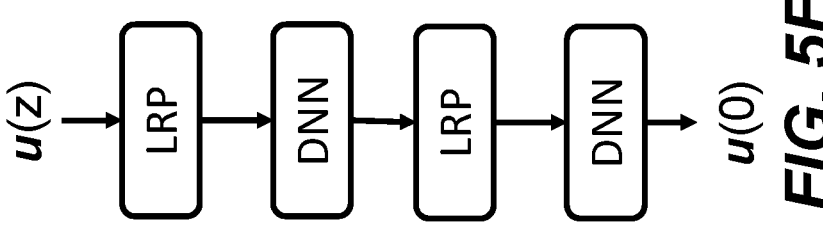
FIG. 5E shows another embodiment using a cascaded stacking of multiple LRP models and multiple deep neural network (DNN) blocks for residual model mismatch correction, according to embodiments of the present invention.
Figure 5D:
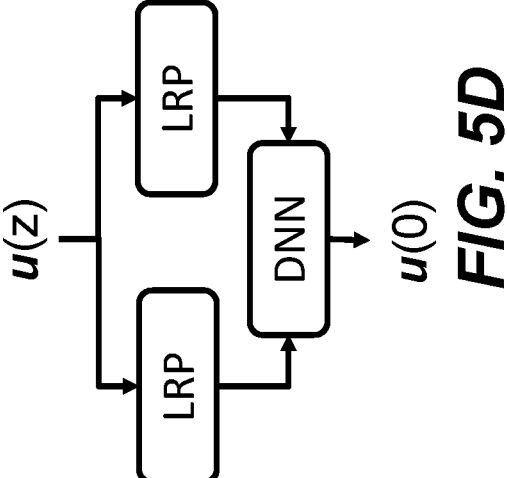
FIG. 5D shows another embodiment using parallel LRP models aggregated with an external deep neural network (DNN) for residual model mismatch correction, according to embodiments of the present invention.

FIG. 5D shows another embodiment where parallel physi-cal models are aggregated by a DNN block. FIG. 5E shows another embodiment where multiple LRPs and DNNs are stacked in a cascaded way. FIG. 5F shows another embodi-ment using a jumping path of intermediate signals to feed into a DNN block in later stage. The embodiments in FIG. 4 and FIGS. 5A to 5F are just examples of potential integration of physical models into DNN architectures through a combination of a cascaded stacking, a parallel aggregation, a jumping aggregation, a staggered control, and so on.

Some embodiments use SSFM as a base physics model instead of RP to generalize towards adjustable model with additional phasor correction and low-pass filters. For SSFM models, there are four different variants: i) simple SSFM; ii) full SSFM; iii) reduced SSFM; iv) Agrawal SSFM as follows.

$$\text{simple } SS \quad B_h(z+h) = e^{hL}e^{hN(B_h(z))}B_h(z)$$

$$\text{full } SS \quad B_h(z+h) = e^{\frac{h}{2}L}e^{hN(B_h(z))}e^{\frac{h}{2}L}B_h(z)$$

$$\text{reduced } SS \quad B_h(z+h) = e^{\frac{h}{2}L}e^{hN(X)}X, \quad X = e^{\frac{h}{2}L}B_h(z)$$

$$\text{Agrawal } SS \quad B_h(z+h) = e^{\frac{h}{2}L}e^{\frac{h}{2}(N(B_h(z+h)+N(B_h(z))))}e^{\frac{h}{2}L}B_h(z)$$

Some embodiments use different parameterization according to those different types of SSFM physics models. Agrawal SSFM requires iterative loops to propagate the waveform. Some embodiments use implicit neural networks to solve this iterative process. For example, neural ordinary differential equation (NODE), deep equilibrium (DEQ), and neural diffusion model are used to realize PINN-based equalizers. Although linear operations are usually realized in frequency domain, time-domain convolution or filtering can be also used for some embodiments. In addition, both time-domain and frequency-domain operations are mixed up in PINN architecture. For WDM and spatial multiplexing systems, space-domain processing is also merged into PINN for some embodiments. The equalizers are also used at the transmitter as a pre-equalizer or pre-distortion method, which inverts the signal distortion in prior to transmitting over the channel in a similar manner for the post equaliza-tion at receiver. Some embodiments use both pre-equalizer and post-equalizer at the same time.

Besides RP and SSFM, there are different methods to solve the NLSE. For example, the Runge-Kutta (RK) method as one of collocation methods can numerically solve the PDE in higher precision. Some embodiments use the RK model integrated in DNN architecture to solve the inverse NLSE. Another example of numerical methods is the exponential integrator (EI), where Krylov subspace approximation is used for the matrix exponential operator. For example, Marcuse method and Blow-Wood method are used as EI framework. Some embodiments use the EI method as PINN-based equalization.

Nonlinear Fourier Transforms (NFT)

There is another physical modeling framework known as nonlinear Fourier transforms (NFT) to solve the NLSE. The NFT transforms waveform onto an eigen-domain in which NLSE dynamics acts linearly. For example, the Koopman operator realizes the NFT. To realize Koopman-based NFT, an exemplar PINN uses an auto encoder (AE) that can be used to find a coordinate transformation that turns a non-linear PDE into a linear PDE. Some embodiments of the invention use the Koopman-AE DNN to model the behavior of Manakov's equation applied to nonlinear fiber optics. For long sequence transforms with high oversampling rate, some embodiments split symbol sequences into smaller chunks and splice them back together at the end. To deal with the chromatic dispersion-induced channel memory effects, chunk overlapping and edge discarding are used during DNN recovery. Specifically, it uses apply a sliding window on the DNN input tensor and discard the edge samples for each of the processed chunks. The PINN is trained to minimize the minimum squared error function (MSE) between the time-domain SSFM data and the generated prediction. In this case, the task of Koopman DNN was to predict every step of a 100-step SSFM Manakov simulation over a few span of fiber. Other cost function such as cross entropy loss is alternatively used for some embodiments. Some embodiments use invertible residual network to facilitate optimization of forward NFT and inverse NFT.

Digital Twin-Based End-to-End Design

The PINN-based equalization can provide additional benefit to optimize other system parameters such as pulse-shaping filters, modulation schemes, constellation shaping, and FEC parameters through gradient propagation over system diagrams. For example, once the LRP-based PINN model is trained to model the channel for communications, the trained PINN model can be used to predict the forward and backward behaviors as a digital twin model. In such a manner, the PINN enables end-to-end design of transmitter parameters and receiver parameters. For some embodiments, those parameters are also trained by reinforcement learning for gradient-free optimization. For some embodiments, the end-to-end design is extended to design intermediate sub-system components such as parametric amplifiers, repeaters, relays, switches, and routers. For example, gain control at amplifiers and routing optimizations are realized by the digital-twin PINK model.

Other Features

Other embodiments include quantum communications wherein quantum physics are modeled in PINN-based equalization. Yet another embodiment include molecular communications wherein molecular dynamics and chemical reaction physics are integrated as PINN-based equalization. Some other embodiments use neuronal communications wherein neuro-physics are modeled in PINN-based equalization.

Figure 7:
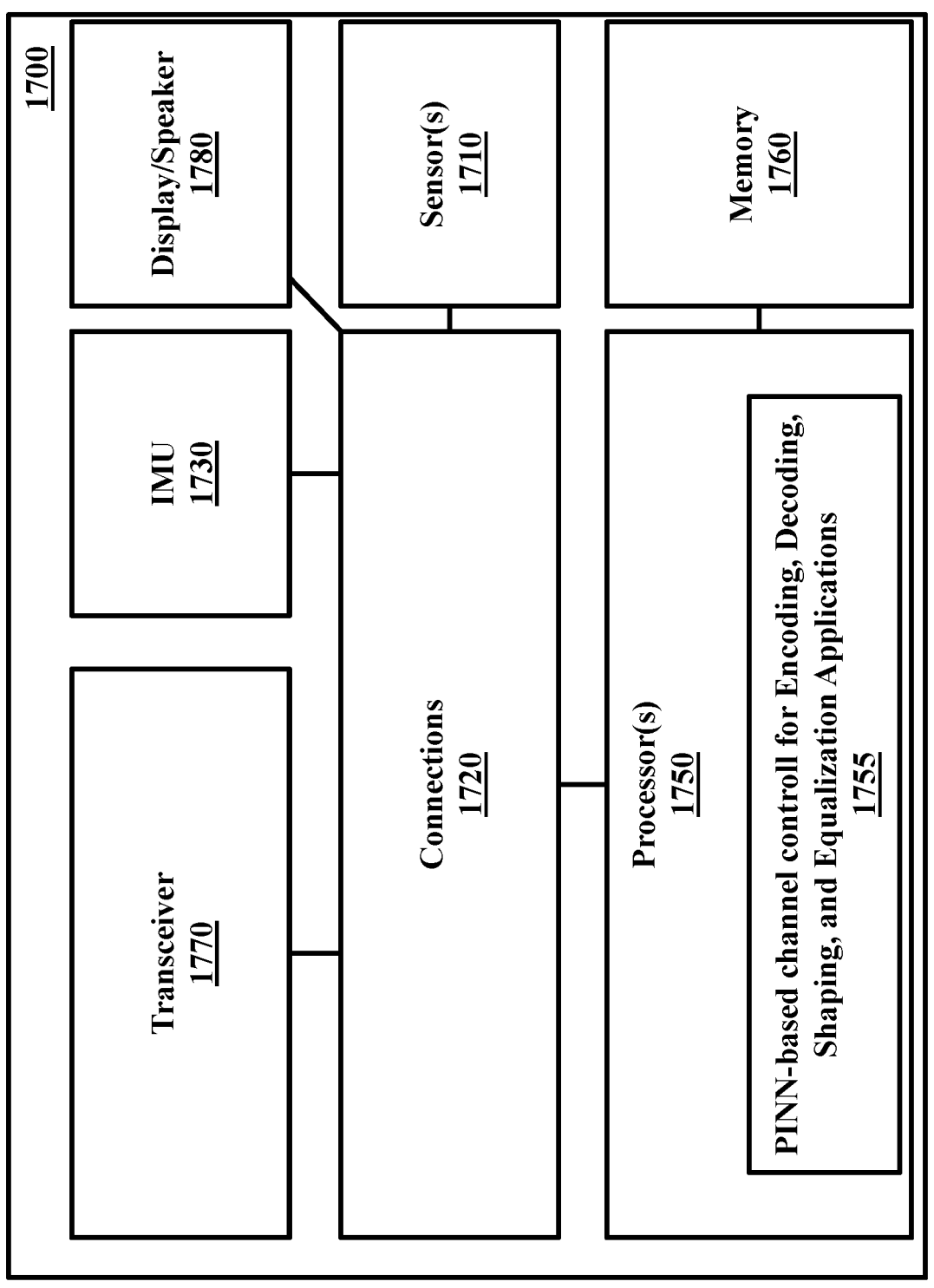
FIG. 7 shows an exemplar block diagram of a system suitable for implementing different components of the transceiver for performing the encoding, decoding, equalization, and deshaping, according to embodiments of the present invention.

FIG. 7 shows an exemplar block diagram of a system suitable for implementing different components of the receiver for performing the decoding, equalization, and deshaping according to some embodiments and/or the transmitter for encoding, pre-equalization, and shaping the codeword according to some embodiments. The system 1700 can include one or combination of a sensor 1710, an inertial measurement unit (IMU) 1730, a processor 1750, a memory 1760, a transceiver 1770, and a display/screen 1780, which can be operatively coupled to other components through connections 1720. The connections 1720 can comprise buses, lines, fibers, links or combination thereof.

The transceiver 1770 can, for example, include a transmitter enabled to transmit one or more signals over one or more types of communication networks and a receiver to receive one or more signals transmitted over the one or more types of communication networks. The transceiver 1770 can permit communications with wired or wireless networks based on a variety of technologies such as, but not limited to, femtocells, Wi-Fi networks or wireless local area networks (WLANs), which may be based on the IEEE 802.11 family of standards, wireless personal area networks (WPANS) such as Bluetooth, near field communication (NFC), networks based on the IEEE 802.11 family of standards, and/or wireless wide area networks (WWANs) such as LTE, WiMAX, etc. The system can also include one or more ports for communicating over wired networks such as fiber-optic communications.

In some embodiments, the processor 1750 can also receive input from IMU 1730. In other embodiments, the IMU 1730 can comprise 3-axis accelerometers, 3-axis gyroscopes, and/or magnetometers. The IMU 1730 can provide velocity, orientation, and/or other position related information to the processor 1750. In some embodiments, the IMU 1730 can output measured information in synchronization with the capture of each image frame by the sensor 1710. In some embodiments, the output of the IMU 1730 is used in part by the processor 1750 to fuse the sensor measurements and/or to further process the fused measurements.

The system 1700 can also include a screen or display and speaker 1780 rendering images, such as color and/or depth images. In some embodiments, the display and speaker 1780 can be used to display live images captured by the sensor 1710, fused images, augmented reality images, graphical user interfaces (GUIs), and other program outputs. In some embodiments, the display 1780 can include and/or be housed with a touchscreen to permit users to input data via some combination of virtual keyboards, icons, menus, or other GUIs, user gestures and/or input devices such as styli and other writing implements. In some embodiments, the display 1780 can be implemented using a liquid crystal display or a light emitting diode (LED) display, such as an organic LED display. In other embodiments, the display 1780 can be a wearable display.

Exemplary system 1700 can also be modified in various ways in a manner consistent with the disclosure, such as, by adding, combining, or omitting one or more of the functional blocks shown. For example, in some configurations, the system 1700 does not include the IMU 1730 or the sensors 1770. In some embodiments, portions of the system 1700 take the form of one or more chipsets, and/or the like.

The processor 1750 can be implemented using a combination of hardware, firmware, and software. The processor 1750 can represent one or more circuits configurable to perform at least a portion of a computing procedure or process related to sensor fusion and/or methods for further processing the fused measurements. The processor 1750 retrieves instructions and/or data from memory 1760. The processor 1750 can be implemented using one or more application specific integrated circuits (ASICs), central processing units (CPUs), graphical processing units (GPUs), digital signal processors (DSPs), DSP devices, programmable logic devices (PLDs), field programmable gate arrays (FPGAs), controllers, micro-controllers, microprocessors, embedded processor cores, quantum computing processors, electronic devices, quantum processors, molecular processors, other electronic units designed to perform the functions described herein, or a combination thereof.

The memory 1760 can be implemented within the processor 1750 and/or external to the processor 1750. As used herein the term "memory" refers to any type of long term, short term, volatile, nonvolatile, or other memory and is not to be limited to any particular type of memory or number of memories, or type of physical media upon which memory is stored. In some embodiments, the memory 1760 holds program codes that facilitate the equalization, pre-equalization, decoding, shaping, deshaping, and encoding.

In some embodiments, additionally or alternatively, the processor 1750 can perform one or combination of the encoding, decoding, and shaping/deshaping applications 1755. For example, the output of the decoding can be used for decoding concatenated ECCs, which are formed from multiple component ECCs that are combined into a higher performance code. Another example is a system employing iterative equalization and decoding, where soft-decision output from decoder is fed back to demodulator to refine the decoder input iteratively. Yet another example is acting on the decoded output, e.g., showing the output on the display and speaker 1780, storing the output in the memory 1760, transmitting the output using the transceiver 1770, and/or performing the actions based on the output and measurements of the sensor 1710.

Further, another embodiment of the present invention can provide an encoder circuit for generating an encoded digital data from an input digital data. The encoder/shaping circuit is configured to generate an encoded/shaped digital data from a source bit stream as an input digital data. The encoder/shaping circuit are configured to receive the source bit stream 111, at least one memory bank configured to store a computer-executable encoding method (program/computer-executable instructions/or equivalent circuit), and one or more computing processors configured to generate a codeword as an encoded digital data from the input digital data by performing steps of the computer-executable encoding method. In this case, the computer-executable encoding method is configured to cause the processor to perform steps based on a code specification. In some embodiments, the generated digital data is modulated to be fed into the communication channel 120 via the front-end circuit 115.

All the above-described embodiments of the present invention can be implemented in any of numerous ways. For example, the embodiments may be implemented using hardware, firmware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed is:

1. A system for data communications over a channel link, comprising:
   a communication module configured to access the channel link according to a set of specifications for the data communications; and
   a controller configured to include a physics-informed neural network (PINN), wherein the controller is configured to determine parameters represented by the set of specifications of the communication module to compensate signal waveform distortion in the data communications according to a physical model of the channel link, and wherein the PINN is based on a cascaded use of regular perturbation models having a phasor correction term trained by a deep neural network (DNN) based on statistical information of the channel link.

2. The system of claim 1, wherein the channel link is based on one of electromagnetic propagation, lightwave propagation, acoustic propagation, or molecular propagation for the data communications.

3. The system of claim 1, wherein the set of specifications of the communication module include a set of parameters for a channel encoder, a data compressor, a constellation shaper, a modulator, a pulse-shaping filter, a multiplexer, a pre-equalizer, an amplifier, a digital-analog converter, an oscillator, an antenna, a mixer, an analog-digital converter, an equalizer, a demultiplexer, a demodulator, a constellation deshaper, a data decompressor, and a channel decoder.

4. The system of claim 3, wherein the set of parameters include a generator matrix of a channel coding, a shaping rate, a shaping method, a modulation format, a pulse-shaping filter length, a pre-equalizer method, an amplifier gain, a sampling rate and a quantization bit of a digital-analog converter, an oscillator frequency, an antenna size, a sampling rate and a quantization bit of an analog-digital converter, an equalizer method, a demodulator method, a constellation deshaper method, and a channel decoder method.

5. The system of claim 1, wherein the physical model of the channel link is based on a finite-difference method, a finite-element method, a collocation model, a Volterra series expansion, a Koopman operation, an exponential integrators, an ordinary differential equation, a partial differential equation, a nonlinear Schrodinger equation, a finite impulse response, an infinite impulse response, an autoregressive model, a diffusion process, a space-time-frequency dispersion model, Maxwell equation, a quantum dynamics, and a molecular dynamics.

6. The system of claim 1, wherein the PINN is configured to integrate the physical model of the channel link into the DNN having an additional set of trainable parameters to adjust a residual error caused by a model mismatch.

7. The system of claim 6, wherein the DNN integrated with the PINN is based on a combination of a parallel aggregation, a cascaded stacking, a staggered controlling, and a jumping aggregation.

8. The system of claim 1, wherein the communication module uses another PINN modified by the controller to further modify the set of specifications of the communication module.

9. The system of claim 1, wherein the communication module comprising:

an encoder to encode a data to codewords based on a channel code;

a shaping mapper to map the codewords to amplitude symbols;

a pre-equalizer to modify, using a trained physics-informed neural network (PINN), the mapped amplitude symbols to pre-equalized symbols based on the physical model;

a digital-analog converter to transmit digital data of the pre-equalized symbols over the channel link as channel data;

an analog-digital converter to receive the channel data from the channel link to produce received symbols;

a demodulator to modify the received symbols as an intermediate estimate of the digital data;

a PINN-based post-equalizer to mitigate channel noise and waveform distortions caused by the channel link based on the intermediate estimate of the digital data to produce an equalized data;

a shaping demapper to modify the equalized data into a deshaped bit sequence as a deshaped data; and a decoder, by use of a channel decoding, to decode the deshaped data to correct residual errors.

10. A method for data communications over a channel link comprising steps of:

accessing the channel link according to a communication method based on a set of specifications for the data communications; and modifying the set of specifications for the data communications according to a control method based on a physics-informed neural network (PINN) according to a physical model of the channel link, wherein the PINN is based on a cascaded use of regular perturbation models having a phasor correction term trained by a deep neural network (DNN) based on statistical information of the channel link.

11. The method of claim 10, wherein the channel link is based on one of electromagnetic propagation, lightwave propagation, acoustic propagation, or molecular propagation for the data communications.

12. The method of claim 10, wherein the set of specifications of the data communication include a set of parameters for a channel encoding, a data compressing, a constellation shaping, a modulating, a pulse-shaping filtering, a multiplexing, a pre-equalization, an amplification, a digital-analog converting, an oscillating, an analog-digital converting, an equalization, a demultiplexing, a demodulation, a constellation deshaping, and a channel decoder.

13. The method of claim 12, wherein the set of parameters include a generator matrix of a channel coding, a shaping rate, a shaping method, a modulation format, a pulse-shaping filtering length, a pre-equalization method, an amplification gain, a sampling rate and a quantization bit of a digital-analog converting, an oscillation frequency, a sampling rate and a quantization bit of an analog-digital converting, an equalization method, a demodulating method, a constellation deshaping method, and a channel decoder method.

14. The method of claim 10, wherein the physical model of the channel link is based on a finite-difference method, a finite-element method, a collocation model, a Volterra series expansion, a Koopman operation, an exponential integrators, an ordinary differential equation, a partial differential equation, a nonlinear Schrodinger equation, a finite impulse response, an infinite impulse response, an autoregressive model, a diffusion process, a space-time-frequency dispersion model, Maxwell equation, a quantum dynamics, and a molecular dynamics.

15. The method of claim 10, wherein the PINN is configured to integrate the physical model of the channel link into the DNN having an additional set of trainable parameters to adjust a residual error caused by a model mismatch.

16. The method of claim 15, wherein the DNN integrated with the PINN is based on a combination of a parallel aggregation, a cascaded stacking, a staggered controlling, and a jumping aggregation.

17. The method of claim 10, wherein the communication method uses another PINN modified by the control method to further modify the set of specifications of the communication method.

18. The method of claim 10, wherein the communication method comprising a combination of steps:

acquiring source data to be transmitted via a data interface port for the data communications;

encoding the source data to codewords based on a channel code;

mapping the codewords to amplitude symbols;

modifying, using a trained physics-informed neural network (PINN) based pre-equalization, the mapped amplitude symbols to pre-equalized symbols based on the physical model;

transmitting digital data of the pre-equalized symbols over the channel link as channel data;

receiving the channel data from the channel link to produce received symbols;

demodulating the received symbols to produce an intermediate estimate of the digital data;

mitigating, by use of a PINN-based post-equalization, channel noise and waveform distortions caused by the channel link based on the intermediate estimate of the digital data to produce an equalized data;

converting, by use of a shaping demapping, the equalized data into a deshaped bit sequence as a deshaped data;

decoding, by use of a channel decoding, the deshaped data to correct residual errors; storing the corrected channel data to a data sink.

* * * * *